(12) United States Patent
Zarubin (10) Patent No.: US 6,792,250 B1
(45) Date of Patent: Sep. 14, 2004

(54) METHOD AND SYSTEM FOR SPURIOUS AND NOISE CANCELLATION IN A WIRELESS TRANSMITTER

(75) Inventor: Alex Zarubin, San Diego, CA (US)

(73) Assignee: Mitsubishi Electric Corporation, Amagasaki (JP)

( * ) Notice: Subject to any disclaimer, the term of this patent is extended or adjusted under 35 U.S.C. 154(b) by 677 days.

(21) Appl. No.: 09/823,401

(22) Filed: Mar. 30, 2001

(51) Int. Cl.[7] .............................................. H04B 17/00
(52) U.S. Cl. ...................... 455/115; 455/63.1; 455/296; 327/105
(58) Field of Search ................................ 455/115, 63.1, 455/78, 82, 570, 296, 304, 305, 306, 307, 308, 319, 326; 370/278, 282; 327/105, 113, 115, 355, 361, 357; 342/118

(56) References Cited

U.S. PATENT DOCUMENTS 5,606,286 A    2/1997  Bains .......................... 330/149
6,169,912 B1 *  1/2001  Zuckerman ................. 455/570
6,353,406 B1 *  3/2002  Lanzl et al. ................. 342/118
6,545,516 B2 *  4/2003  Ylamurto et al. ........... 327/113

* cited by examiner

Primary Examiner—Tony T. Nguyen
(74) Attorney, Agent, or Firm—Oblon, Spivak, McClelland, Maier & Neustadt, P.C.

(57) ABSTRACT

A system and method for noise and spurious cancellation in a filter system having a phase shift network for attenuating and canceling an unwanted spurious RF signal component. A signal splitter splits an input signal into a primary and a secondary component. The phase shift network attenuates and phase shifts the secondary signal component by 180 degrees relative to the primary prefiltered signal in such a way that a sideband spur directly cancels with the filtered output primary signal in a subsequent combining stage.

24 Claims, 6 Drawing Sheets

METHOD AND SYSTEM FOR SPURIOUS AND NOISE CANCELLATION IN A WIRELESS TRANSMITTER

BACKGROUND OF THE INVENTION

1. Field of the Invention

The present invention relates generally to wireless communications, but more specifically to methods and systems for cancellation of noise and spurious signal components in a wireless transmitter.

2. Background

A transmitter in a wireless network is responsible for generating a high power output signal with adequate signal strength to deliver a sender's message. Additionally, several components of the transmitter system work together to ensure that a clean, distortion-free signal reaches the receiver. One such component is the transmitter's radio frequency (RF) filter system. The filter stage ensures that the integrity of a sender's message is not threatened by the many compromising system components that the signal encounters as it progresses through the transmitter. Intermodulation distortion (intermod) is perhaps the most well-known example of such a component.

Intermod is a normal byproduct of signal modulation. Intermod is the result of unwanted harmonic byproducts that naturally occur at the output of the mixing stage. Modulation byproducts include odd- and even-order harmonics, some of which remain in the passband of the filter system and corrupt the purity of the message bit stream. Not all harmonics survive modulation with enough power to have a damaging effect on the signal; but, those harmonics that do make it through the modulation stage must be filtered out prior to signal amplification in order to maintain signal integrity through the transmission channel and at the receiver.

A filter system usually rejects the unwanted harmonic byproducts of modulation with ease because the odd- and even-order products occur at predictable frequencies. However, Intermod is not the only source of undesirable signal components. Spurious signal distortion (spurious) is a well-known phenomenon with multiple sources that also contributes to signal degradation. Spurious is especially harmful because it often results in unwanted signal spurs spilling into the bandwidth of the receive channel. Transmitter components such as oscillators, clocks, and automatic gain control devices, to name a few, all may contribute spurious signal components into the mix.

Rejection is both a qualitative and a quantitative measure of a filter system's capacity to eliminate both noise and spurious components. Efforts to filter spurious from a signal depend in large part upon a filter system's ability to reject sideband noise and spurious signal components without introducing undesirable filter side effects. One such side effect, for instance, is power loss caused by poor impedance match between filter input or output and upstream or downstream transmitter components. The parasitic capacitive coupling caused by impedance mismatch drains RF energy from the signal.

Methods of eliminating noise and spurious include feedback, feed forward, signal predistortion and the like. However, these methods are not suitable in all situations. For example, in a filter system that relies on passive components, or is otherwise designed to have less than unity gain, contemporary feedback techniques are ineffective because the absence of active components means the output signal is incapable of supplying adequate power to the feedback path. Furthermore, these techniques have been applied almost exclusively to the linearization of active transmitter components such as the power amplifier, ignoring the filter stage.

SUMMARY OF THE INVENTION

The disadvantages of the above mentioned methods previously used to handle harmful noise and spurious are overcome by coupling a passive, frequency-dependent phase shift network in parallel with a transmitter's filter system.

The method and apparatus for spurious and noise cancellation couples a phase shift network to the filter system of a wireless transmitter. A signal splitter splits the signal into a primary prefiltered signal and a secondary prefiltered signal. Each of the primary and secondary prefiltered signals comprises a desirable signal component centered at a first frequency, and an unwanted signal component centered at a second frequency. The primary prefiltered signal is fed to the input of a filter, which filter generates a filtered output signal. The secondary prefiltered signal is fed to the input of a phase shift network In one embodiment, the phase shift network comprises passive components of resistance, capacitance, and inductance. The resistive components can be a simple voltage divider network that acts as an attenuator to the secondary prefiltered signal, while the resistive and reactive components together provide the necessary attenuation to filter out the desirable signal component, passing the unwanted signal component. The phase shift network inverts the phase of the unwanted signal component by 180 degrees relative to the primary prefiltered signal before combining the signal with the filtered output signal from the filter.

Finally, the method and apparatus for spurious and noise cancellation in a wireless transmitter achieves significant filter sideband rejection without incurring any noticeable passband degradation.

Further features and advantages of this invention as well as the structure of operation of various embodiments are described in detail below with reference to the accompanying drawings.

BRIEF DESCRIPTION OF THE DRAWINGS

In the figures of the accompanying drawings, like reference numbers correspond to like elements.

DETAILED DESCRIPTION OF THE PREFERRED EMBODIMENTS

Figure 1:
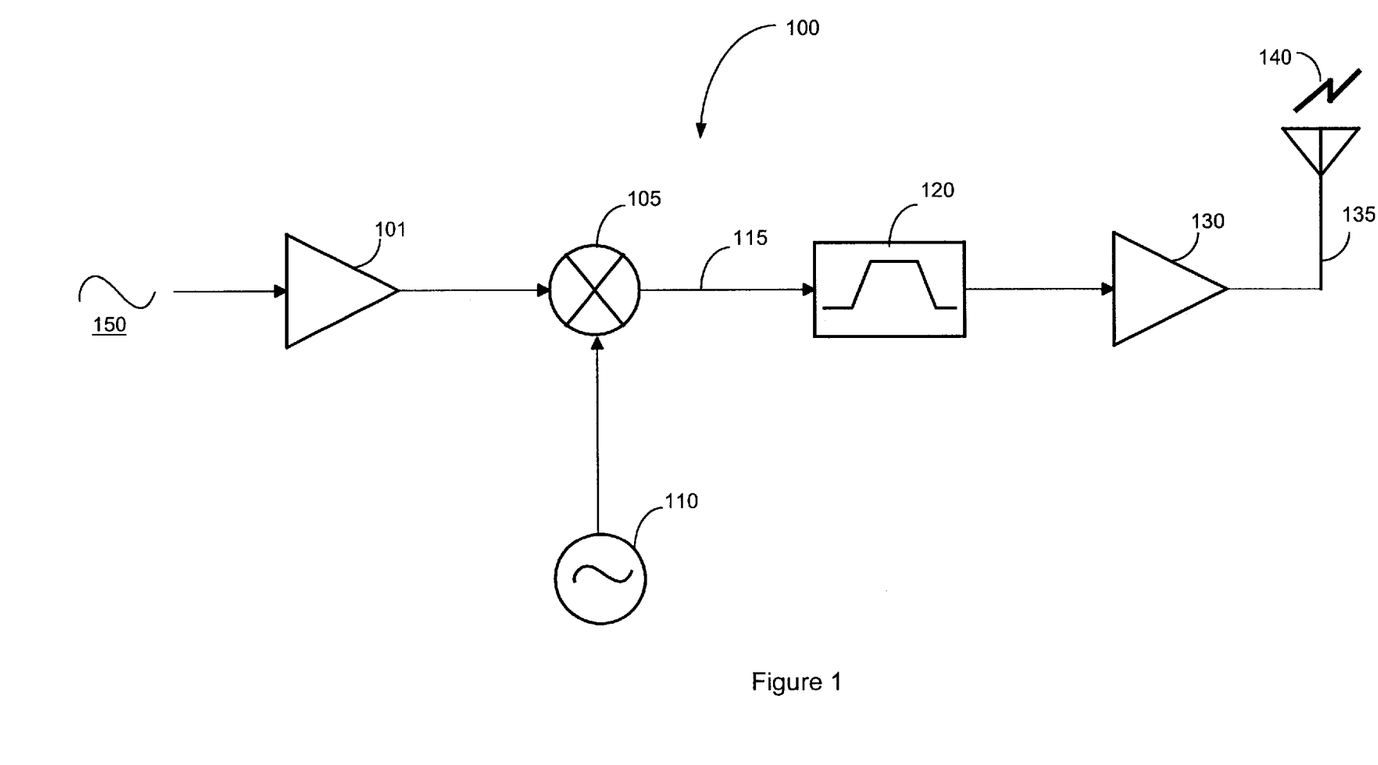
FIG. 1 is a simplified block diagram illustrating the stages of a wireless transmitter.

FIG. 1 is a simplified block diagram illustrating the stages typically found in a modern wireless transmitter 100. In the first stage of wireless transmission an input signal 150 of intermediate frequency (IF) undergoes amplification in an amplifier 101 to bring the signal strength up to a useable level for modulation. The modulator 105 mixes and upconverts the digital signal bit stream onto a RF carrier of a predetermined frequency determinable by the fundamental frequency of the oscillator 110. The resultant RF signal 115 is fed into a filter stage 120 designed to remove signal components outside of the acceptable passband. Finally, a power amplifier 130 amplifies the signal to a level appropriate for delivery over wireless channel 140 via antenna 135.

Input signal 150 may become tainted with noise and spurious from these various transmitter components. In a transmitter with only a single filter stage, such as the transmitter shown in FIG. 1, the filter must be designed to eliminate all spurious, noise, and other unwanted frequency components in a single pass. To this end, filter system 120 is designed to have a frequency-dependent response curve that blocks the passage of specific noise and spurious, which occur at known predictable frequencies. The frequency-dependent pass band of filter system 120 is characterized in part by its magnitude frequency response plot, as described below. For our purposes, the frequency-dependent phase response plot is omitted.

Figure 2:
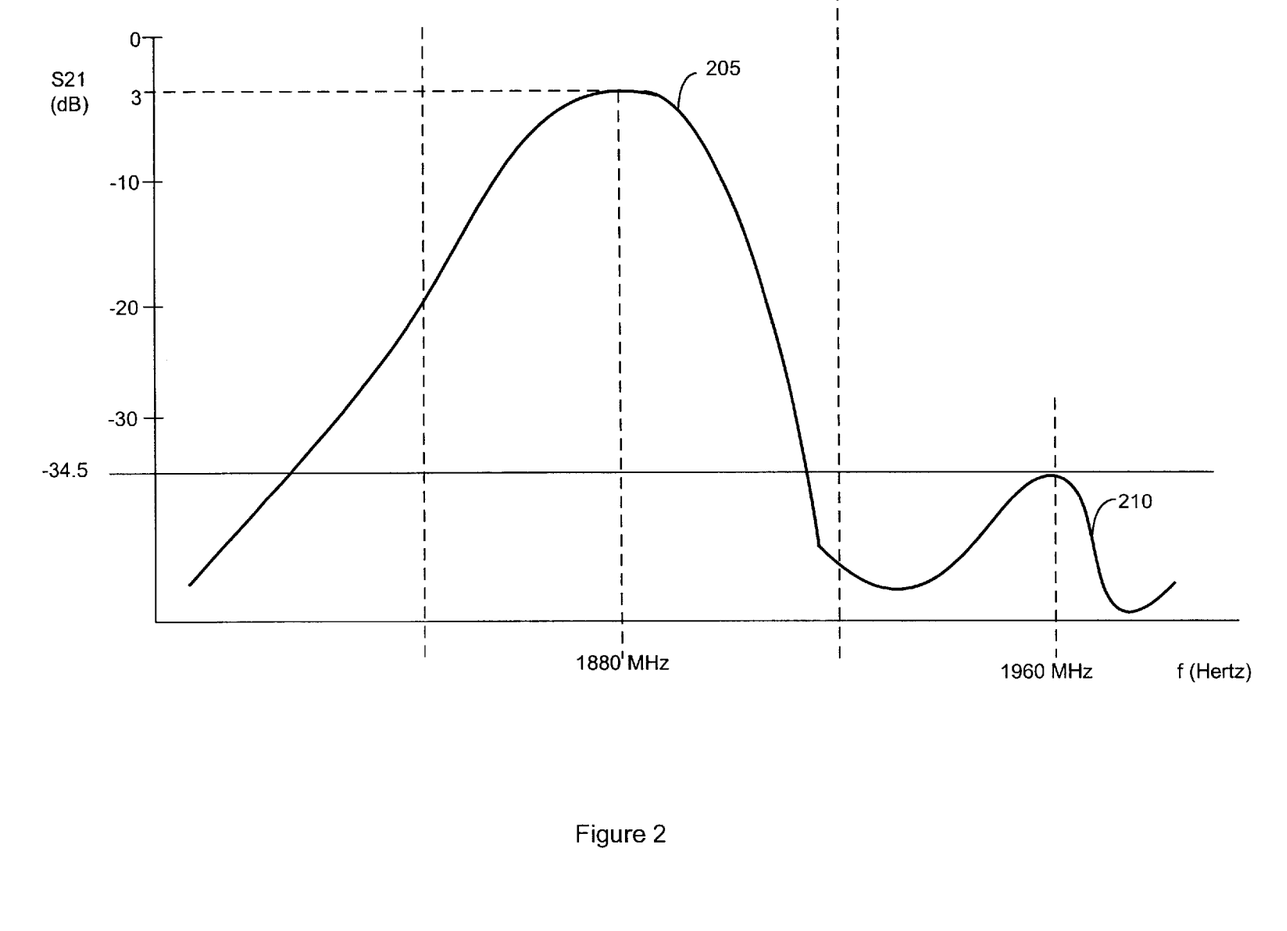
FIG. 2 is a graphical representation of the magnitude frequency response of bandpass filter 120 of FIG. 1.

FIG. 2 is a graphical representation of the magnitude frequency response of bandpass filter 120 of FIG. 1 when driven by an input signal having a main signal component and a sideband signal spur. The horizontal axis of FIG. 2 is measured in units of frequency, (Hertz), while the vertical axis records the filter forward coefficient, $S_{21}$, gain in decibels (dB). The magnitude frequency response of FIG. 2 is very often generated, for example, by a vector network analyzer, or other test measurement equipment, which allows the test engineer to simulate working conditions of the device.

The forward gain frequency response curve of FIG. 2 is composed of a bandpass region 205 followed by a small sideband signal spur 210. Sideband spur 210 is caused by power leakage due to the parasitic effects of capacitive and/or inductive coupling as the input signal traverses the transmitter's components. This power leakage is especially harmful because it interferes directly with the receive channel as described in the next paragraph. Additionally, random noise may bleed into the receive channel from nearby noise-generating sources. Therefore, it is a principle objective of the method and system for spurious and noise cancellation to further reduce or eliminate any unwanted noise and signal spurs.

Bandpass filter 120 is designed having characteristics, such as center frequency and rolloff, which permit the passing of signal frequencies in a certain carrier frequency range. FIG. 2 is a frequency response plot of the ceramic style bandpass filter found, for example, in the Mitsubishi T300 PCS transmitter when tested on an evaluation board under industry-standard 50-Ohm conditions.

The measurement data used to generate the frequency-dependent transfer curve of FIG. 2 is derived from the small signal scattering parameters of the device under test. In particular, FIG. 2 is the $S_{21}$ forward gain scatter parameter of the filter system under test, defined in terms of the incident and reflected travelling wave values at defined input and output port locations and in terms of defined input and output port termination conditions.

Figure 3:
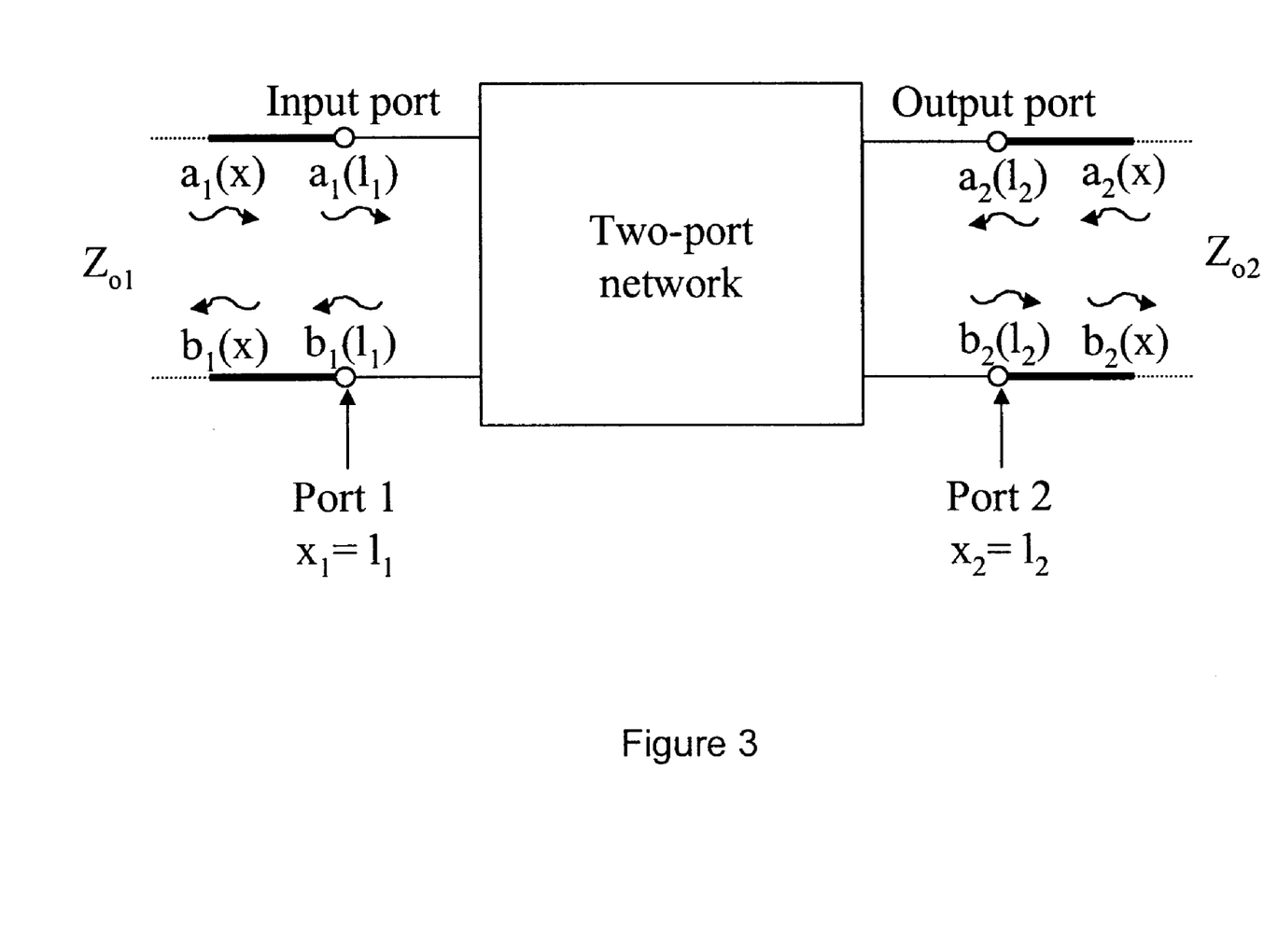
FIG. 3 is a diagram of a preferred two-port network used to derive the small signal forward gain coefficient, $S_{21}$, as adapted from Gonzalez, Guillermo, Microwave Transistor Amplifiers Analysis and Design, Second Edition, Prentice Hall, 1997, pp. 23–24.

FIG. 3 is a diagram showing a two-port network model used in deriving the small signal scatter parameters as adapted from Gonzalez, Guillermo, Microwave Transistor Amplifiers Analysis and Design, Second Edition, Prentice Hall, 1997, pp. 23–24. Small signal $a_1(x)$ is the traveling wave incident on the input port of the network; small signal $b_1(x)$ is the traveling wave reflected from the input port of the network. Similarly, small signal $a_2(x)$ is the traveling wave incident on the output port of the network, and small signal $b_2(x)$ is the traveling wave reflected from the output port of the network. The values $a_1(l_1)$, $a_2(l_2)$, $b_1(l_1)$, and $b_2(l_2)$ are the values of the incident and reflected waves at the specific locations denoted as port 1 and port 2 in FIG. 3. $Z_{o1}$ and $Z_{o2}$ are the characteristic impedances of the input and output transmission lines respectively.

In matrix notation the scattering parameters represent reflection and transmission coefficients and take the form:

$$\begin{bmatrix} b_1(l_1) \\ b_2(l_2) \end{bmatrix} = \begin{bmatrix} S_{11} & S_{12} \\ S_{21} & S_{22} \end{bmatrix} \begin{bmatrix} a_1(l_1) \\ a_2(l_2) \end{bmatrix}$$

or, in equation form, $$b_1(l_1) = S_{11} a_1(l_1) + S_{12} a_2(l_2)$$

and $$b_2(l_2) = S_{21} a_1(l_1) + S_{22} a_2(l_2)$$

where the scatter parameters measured at the specific location shown as port 1 and port 2 in FIG. 3 are defined as follows:

$$S_{11} = \left. \frac{b_1(l_1)}{a_1(l_1)} \right|_{a_2(l_2)=0} \quad \text{input reflection coefficient with output properly terminated}$$

$$S_{21} = \left. \frac{b_2(l_2)}{a_1(l_1)} \right|_{a_2(l_2)=0} \quad \text{forward transmission coefficient with output properly terminated}$$

$$S_{22} = \left. \frac{b_2(l_2)}{a_2(l_2)} \right|_{a_1(l_1)=0} \quad \text{output reflection coefficient with input properly terminated}$$

$$S_{12} = \left. \frac{b_1(l_1)}{a_2(l_2)} \right|_{a_1(l_1)=0} \quad \text{reverse transmission coefficient with input properly terminated}$$

In the filter system characterized by FIG. 2, the passband 205 is centered at a carrier frequency range corresponding to an allowable PCS hyperband transmit value of 1880 MHz. The small sideband signal spur 210 occurs at or near the allowable PCS hyperband receive value of 1960 MHz. Sideband spurious appearing in the receive channel degrades communication; thus, signal integrity is dependent upon suppression of any noise and sideband spurious in order to keep the receive channel free from spurious sideband interference.

The embodiment of bandpass filter 120 depicted by the frequency response curve of FIG. 2 further shows that filter attenuation of sideband spur 210 measures −34.5 dB. While this value may represent an appropriate measure of the filter's rejection ratio in some circumstances, it is desirable to reject even more spurious if possible. Engineering design constraints imposed by particular wireless industry standards, for example the International Standard IS 95, sets the requirements for minimum filter rejection for compliant transmitters. Thus, in the present embodiment, the particular wireless standard in use will dictate whether −34.5 dB of spur attenuation represents an acceptable amount of rejection. Furthermore, although the embodiments described herein refer to the 1900 MHz PCS hyperband, the methods and systems for spurious and noise cancellation are designed to broadly cover signal spur rejection by technologies and standards that governing other carrier frequency ranges as well.

Figure 4:
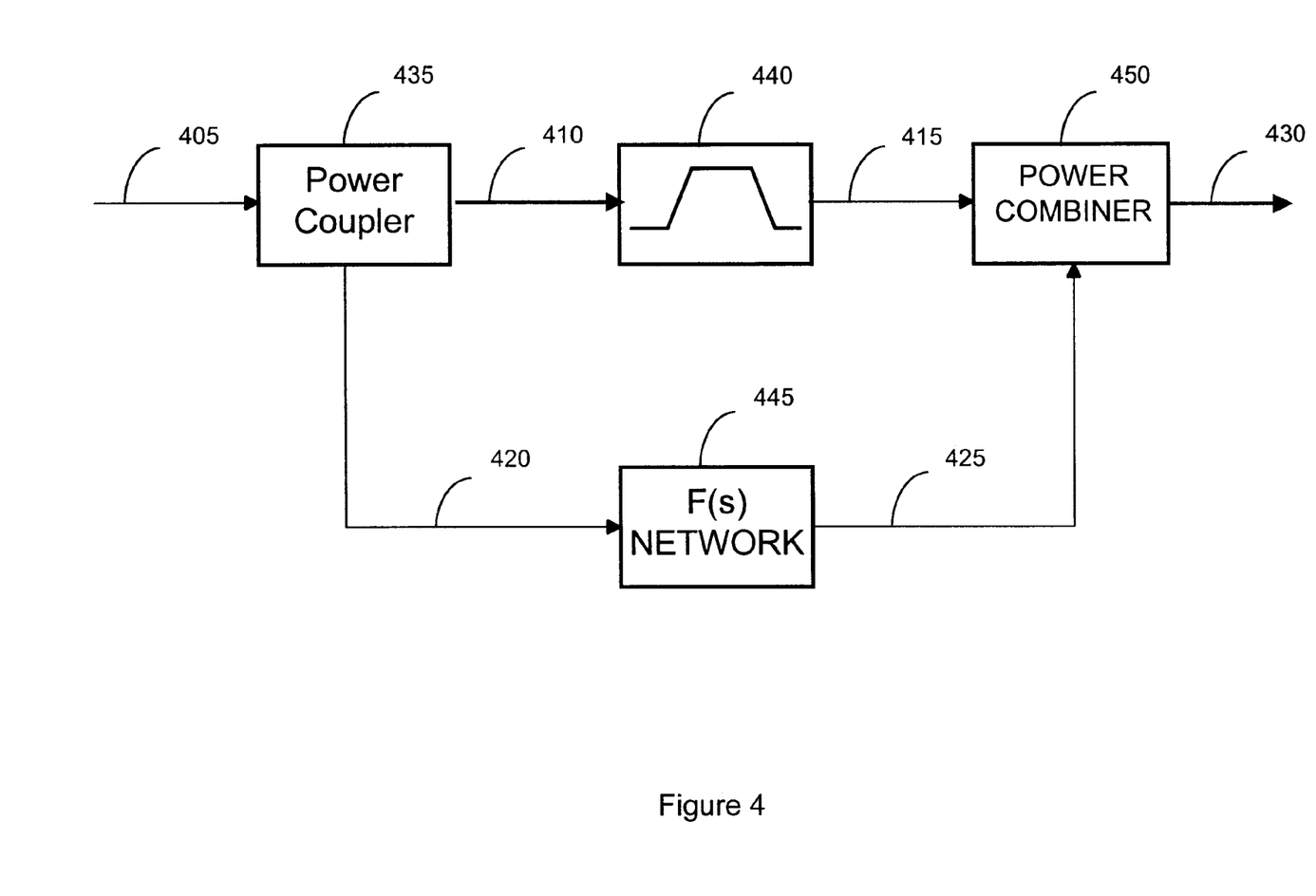
FIG. 4 is a block diagram of one embodiment of the method and system for spurious and noise cancellation.

The method and apparatus for spurious noise cancellation is capable of greater spur suppression because it couples a parallel passive phase-shift network to a transmitter's bandpass filter to provide direct cancellation of an unwanted signal spur. FIG. 4 is a block diagram of an example embodiment of the method and system for spurious and noise cancellation. Input signal 405 is fed into power coupler 435. Power coupler 435 splits input signal 405 into a first prefiltered signal 410 to be fed to bandpass filter 440. Power coupler 435 also splits input signal 405 into a second prefiltered signal 420, to be fed to phase shift network 445. In-phase filtered signal 415, which represents the output of bandpass filter 440, is combined in power combiner 450 with phase-shifted signal 425, which phase-shifted signal represents the output of phase shift network 445. Finally, power combiner 450 generates output signal 430 for delivery to a downstream transmitter component such as power amplifier 130.

In one embodiment, the phase shift network 445 comprises an attenuator, a filter, and a phase shifter: The attenuator is responsible for attenuating the second prefiltered signal 420 to an appropriate level. The filter is tuned to pass only the unwanted signal spur. The phase shifter is responsible for making a 180 degree phase adjustment to the second prefiltered (and now attenuated) signal 420, relative to the primary prefiltered signal, to produce and deliver a phase-shifted signal 425 to the power combiner 450. Finally, combiner 450 takes the phase-shifted signal 425 and combines it with the filtered output signal 415 of bandpass filter 440. Because the phase-shifted signal contains only the unwanted spur, the 180 degree out-of-phase (phase-shifted) signal 425 directly cancels the in-phase (filtered output) signal to produce an output signal 430, the noise and spurious of which has been significantly reduced or altogether eliminated.

It should be noted that the phase shifter might not need to shift the phase of the second prefiltered signal 420 the full 180 degrees. Other components, may shift the phase of the signal when acting on the signal. Therefore, the phase shifter is only responsible for shifting the phase of the signal 420 by whatever angle is required to achieve a 180 degree shift relative to the first prefiltered signal.

As a hypothetical example of the foregoing, consider an input signal having a signal strength measured at 0 dBm for the 1880 MHz component, the same signal having a sideband spur of −8 dBm spilling onto the receive channel at 1960 MHz. Assume also that power coupler 435 presents the second prefiltered signal 410 with a nominal insertion loss of −10 dB and that bandpass filter 440 presents the prefiltered signal 410 with an insertion loss of −3 dB and −27 dB of rejection at 1960 MHz. Under these assumptions, the strength of the signal at the input to the power combiner will measure −3 dBm (0 dB plus −3 dB) at the 1880 MHz center frequency, along with a signal spur whose strength is −38 dBm (−8 dBm plus −3 db plus −27 db) at 1960 MHz.

In order for the spurious component of the phase-shifted signal 425 to cancel the spurious component of the filtered signal 415 we strive to make their respective magnitudes as equal as possible. Hence, the design goal is to attenuate the phase-shifted spur enough to meet the power level of the in-phase spur. With this goal in mind, the phase-shifted spur must be attenuated an additional 20 dB by phase shift network 445 in order to cancel with the −38 dBm output level of in-phase filtered signal 415. Compensating for the 20 dB difference in power level between in-phase filtered signal 415 and 180 degree out-of-phase signal 425 is the responsibility of the attenuator component of phase shift network 445.

The figures used to develop the above hypothetical example are representative of the theoretical foundation for the method and apparatus for spurious and noise cancellation. As a practical matter, however, it is unlikely that the theoretical levels of attenuation and rejection could ever be precisely achieved. As previously shown in FIG. 2, a more practical and realizable level of signal strength for spur 210 at the output of filter 440 may be −34.5 dB. Thus, although a hard industry standard for sideband rejection (e.g., −35 dB) may be exceeded in theory, the realizable level may actually fall short of the stated standard. This practical shortfall is the result of real-world physical constraints and engineering imperfections common to all RF system design. The phase shift network of the method and apparatus for spurious and noise cancellation bridges the gap between engineering objectives and practical limitations, by offering the engineer a practical way to move the design closer to the goal.

The method and apparatus for spurious and noise cancellation achieves significant sideband spur rejection while feeding a very small signal sample to phase shift network 445. Additionally, in one embodiment, phase shift network 445 comprises only passive circuit components, such as resistors and capacitors. Passive circuit components are advantageous for several well-known reasons: (1) passive circuit components do not suffer from potential instability as do their active component counterparts, (2) passive components are less expensive, and (3) passive components simplify device construction when implemented, for example, as board-level surface mount devices. Accordingly, FIG. 5 is a diagram of one possible implementation of phase shift network 445 using only passive components.

Figure 5:
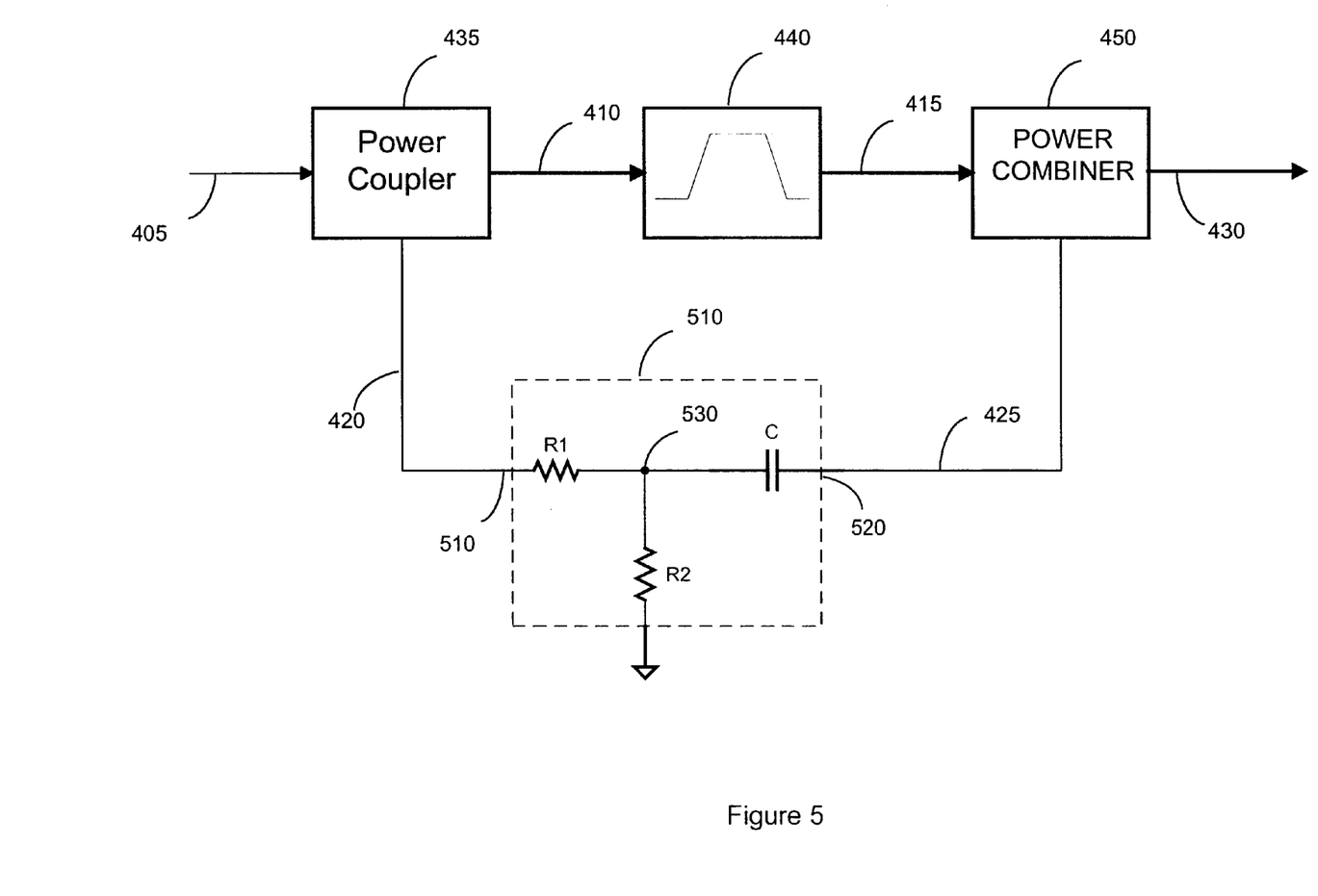
FIG. 5 is a diagram of one embodiment of the phase shift network component of the method and system for spurious and noise cancellation using passive components.

In FIG. 5, bandpass filter 440 produces filtered signal 415 from prefiltered signal 410 as described previously with reference to FIG. 4. Similarly, power coupler 435 splits input signal 405 into prefiltered signal 420 to be fed to the input port 510 of passive phase shift network 445. Also as previously described in FIG. 4, power combiner 450 combines phase-shifted signal 425 (as it exits output port 520 of passive phase shift network 445) with filtered signal 415 of bandpass filter 440 to create output signal 430.

FIG. 5 expands the view of phase shift network 445 of FIG. 4 by further including resistor $R_1$ coupled in series between power coupler 435 and node 530 where $R_2$ and C converge. Resistor $R_2$ is situated as well between node 530 and ground. Finally, capacitor C connects node 530 with power combiner 450. Phase shift network 445 is therefore depicted as a two-port network as just described.

Conceptually, passive phase shift network 445 comprises a purely resistive voltage division stage represented by $R_1$ and $R_2$, followed by a capacitive stage, represented C. The resistive and capacitive stages of phase shift network 445 perform three distinct functions. First, the purely resistive voltage divider subnetwork composed of $R_1$ and $R_2$ act as the attenuator for incoming prefiltered signal 420. Attenuation is necessary to achieve direct cancellation as described in the hypothetical example above. Second, the resistive network composed of $R_1$ and $R_2$ together with capacitance C supply the high pass filtering required to isolate the sideband signal spur present in prefiltered incoming signal 420, while rejecting the frequency components of signal 420 occurring within the bandpass region. Third, the resistive network composed of $R_1$ and $R_2$, together with capacitance C, are responsible for adjusting the phase of the attenuated and filtered sideband spur by 180 degrees relative to the primary prefiltered signal prior to combination in power combiner 450 with filtered signal 415 as previously described in the hypothetical example above.

The method and apparatus for spurious and noise cancellation further contemplates a simplified embodiment wherein the resistive and capacitive stages of phase shift network 445 perform two distinct functions-phase shifting and attenuation. More precisely, it is not necessary, as described in the foregoing example embodiments, that phase shift network 445 perform filtering prior to shifting and attenuating prefiltered incoming signal 420. In such a case, the same resistive network composed of $R_1$ and $R_2$ together with capacitor C are required and together they supply the attenuation and phase adjustment necessary to cancel the sideband signal spur.

Obvious advantages accrue when the aforementioned pre-filtering function is eliminated from phase shift network 445. For one, a reduction in functionality means fewer board-level components and a reduced footprint for the phase shift circuit. Second, fewer board-level components translates into cost savings at the manufacturing stage, as well as the design and testing stages of product development. Finally, the rewards of streamlined circuit design are less troubleshooting and rework for designer and tester alike.

Known to those skilled in the art, capacitor C may of course comprise multiple discrete capacitors connected in series, for instance, in order to achieve the desired effect of a smaller value for C than may be otherwise reachable by C alone. Additionally, the embodiment described above with reference to FIG. 4 is by way of example only—the use of $R_1$ and $R_2$ together with capacitance C are offered up solely to illustrate the advantages of using passive components to achieve the benefits of spurious cancellation using the method and apparatus of spurious and noise cancellation. Also, specific implementations of the method and apparatus of spurious and noise cancellation may required that capacitance C be manipulated to accommodate the proper coupling of output port 520 with power combiner 450 that avoids insidious parasitic effects.

Figure 6:
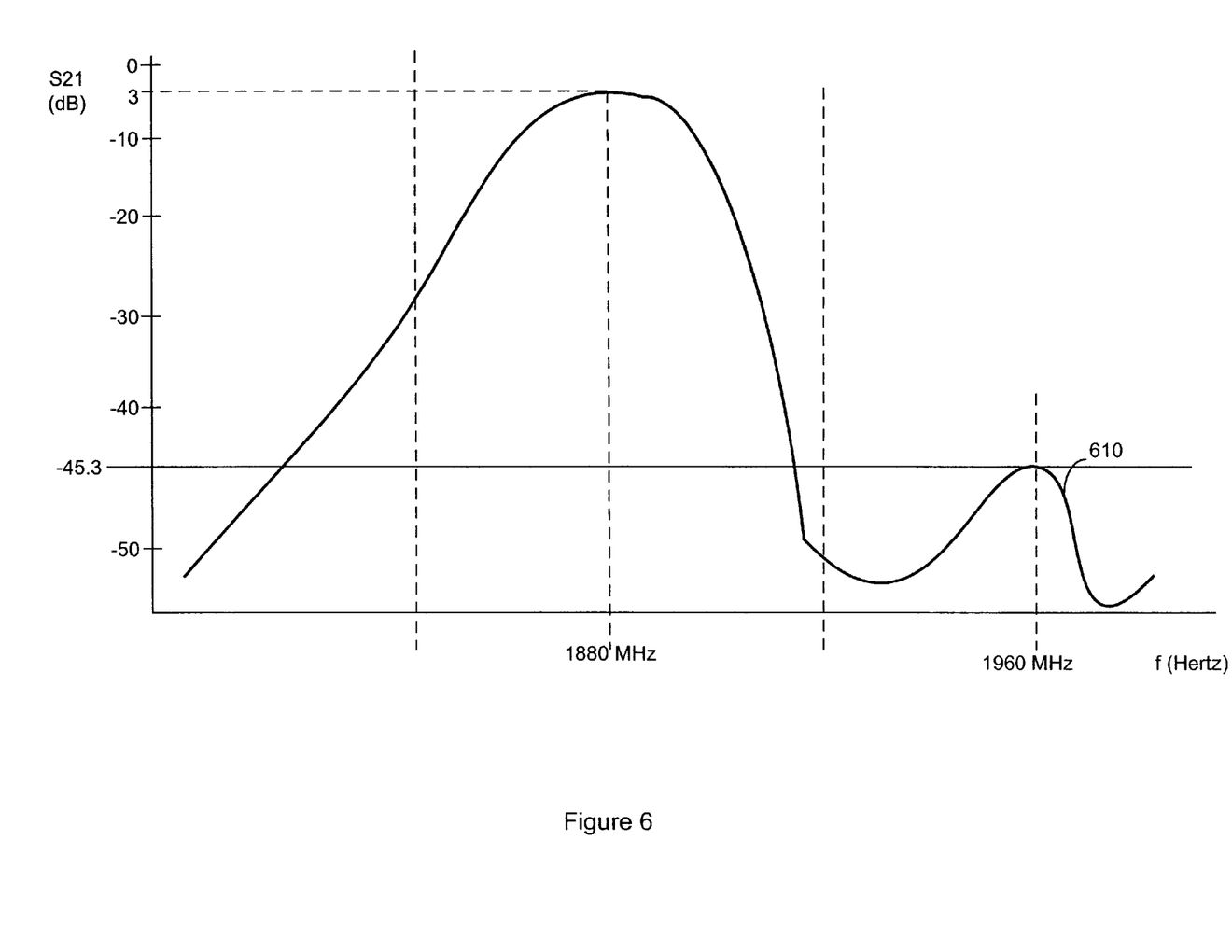
FIG. 6 is a graphical representation of the magnitude frequency response of the filter system of the method and system for spurious and noise cancellation.

FIG. 6 is a graphical representation of the magnitude frequency response of the method and system for spurious and noise cancellation of FIG. 5. The small signal conditions that produced FIG. 2 are again maintained in generating FIG. 6. Likewise, the horizontal axis of FIG. 6 is measured in units of frequency, (Hertz), and the vertical axis records the filter forward gain coefficient, $S_{21}$, in decibels (dB). The embodiment of the method and apparatus for spurious and noise cancellation depicted by the frequency response curve of FIG. 6 demonstrates the aforementioned advantages by showing an attenuation of sideband spur 610 measuring −45.3 dB, a nearly 10 percent improvement. Furthermore, the characteristic filter components (e.g., center frequency and rolloff) associated with the filter system's pass band have suffered no noticeable degradation.

The method and apparatus for spurious and noise cancellation vastly improves a transmitter filter system's rejection without incurring the drawback of higher cost and complexity of active components. In a similar vein, the phase shift network avoids complications with power feedback systems and linearization techniques, which rob a transmitter of precious power output. As well, more costly alternative filtering devices can be avoided. Finally, as demonstrated, the method and apparatus for spurious and noise cancellation improves sideband rejection capability without incurring deformation of the fundamental frequency response characteristics of the filter network.

While embodiments and implementations of the invention have been shown and described, it should be apparent that many more embodiments and implementations are within the scope of the invention. Accordingly, the invention is not to be restricted, except in light of the claims and their equivalents.

What is claimed is:

1. A filter system comprising:
   an input port configured to accept an input signal comprising a prefiltered desirable signal component centered at a first frequency and a prefiltered unwanted signal component centered at a second frequency;
   a filter coupled to the input port, the filter configured to accept the input signal and generate a filtered signal therefrom, the filter further configured to attenuate the prefiltered unwanted signal component while passing the prefiltered desirable signal component;
   a phase-shift network coupled to the input port, the phase-shift network configured to accept the input signal and generate a phase-shifted signal therefrom, the phase-shift network further configured to: (1) block the passage of the prefiltered desirable signal component, (2) attenuate and pass the prefiltered unwanted signal component, (3) shift the phase of the prefiltered unwanted signal component; and
   a combiner coupled to the filter and to the phase-shift network, the combiner configured to combine the filtered signal with the phase-shifted signal.

2. The filter system of claim 1, wherein the filtered signal contains a filtered desirable signal component and a filtered unwanted signal component.

3. The filter system of claim 2, wherein the phase-shifted signal contains an attenuated and phase-shifted replica of the filtered unwanted signal component.

4. The filter system of claim 3, wherein the phase-shift network attenuates the prefiltered unwanted signal by an amount necessary to directly cancel the filtered unwanted signal component of the filtered signal.

5. The filter system of claim 1, wherein the phase-shift network comprises an attenuator configured to attenuate the prefiltered desirable signal and a phase shifter configured to shift the phase of the prefiltered unwanted signal.

6. The filter system of claim 1, wherein the phase-shift network is implemented using passive components.

7. The filter system of claim 1, wherein the filter system is included in a wireless transmitter.

8. The filter system of claim 7, wherein the wireless transmitter is a mobile unit handset.

9. The filter system of claim 1, wherein the filter system is included in a mobile system base station.

10. In a wireless transmitter, a filter system comprising:
    a power splitting means for splitting an incoming signal into a prefiltered desirable signal component centered at a first frequency and an unwanted signal component centered at a second frequency;
    a filtering means for filtering the prefiltered desirable signal component, which filtering means substantially rejects the unwanted signal component while passing the desirable signal component, to produce a filtered signal component therefrom;
    a phase-shifting means for phase-shifting the unwanted signal component by a necessary angle to achieve a 180 degree phase shift relative to the prefiltered desirable signal component in order to produce a phase-shifted signal component therefrom; and
    a combining means for combining the phase-shifted signal component with the filtered signal component such that the filtered signal component substantially cancels with the phase-shifted signal component.

11. The filter system of claim 10, wherein the phase-shifting means further comprises an attenuating means for attenuating the unwanted signal component.

12. The filter system of claim 10, wherein the phase-shifting means further comprises a filtering means for substantially blocking the prefiltered desirable signal component while passing the unwanted signal component.

13. The filter system of claim 10, wherein the phase-shifting means further comprises a passive combination of resistive means and capacitive means.

14. In a transmitter containing a filter system, a method for noise and spurious cancellation comprising the steps of:
configuring the transmitter to split an input signal into a primary prefiltered signal and a secondary prefiltered signal, each of which signals contains a prefiltered desirable component and a prefiltered unwanted component;
attenuating the primary prefiltered signal by a first amount to generate a primary filtered signal;
attenuating the secondary prefiltered signal by a second amount to generate a secondary filtered signal;
shifting the phase of the secondary prefiltered signal by 180 degrees relative to the primary prefiltered signal; and
combining the primary filtered signal with the secondary filtered signal into an output signal.

15. The method for noise and spurious cancellation of claim 14, wherein the step of attenuating the secondary prefiltered signal further comprises the step of filtering the prefiltered desirable component, passing only the prefiltered unwanted component.

16. A filter system comprising:
an input port configured to accept an input signal comprising a prefiltered desirable signal component centered at a first frequency and a prefiltered unwanted signal component centered at a second frequency;
a filter coupled to the input port, the filter configured to accept the input signal and generate a filtered signal therefrom, the filter further configured to attenuate the prefiltered unwanted signal component while passing the prefiltered desirable signal component;
a phase-shift network coupled to the input port, the phase-shift network configured to accept the input signal and generate a phase-shifted signal therefrom, the phase-shift network further configured to: (1) attenuate and pass the prefiltered unwanted signal component, (2) shift the phase of the prefiltered unwanted signal component; and
a combiner coupled to the filter and to the phase-shift network, the combiner configured to combine the filtered signal with the phase-shifted signal.

17. The filter system of claim 16, wherein the filtered signal contains a filtered desirable signal component and a filtered unwanted signal component.

18. The filter system of claim 17, wherein the phase-shifted signal contains an attenuated and phase-shifted replica of the filtered unwanted signal component.

19. The filter system of claim 18, wherein the phase-shift network attenuates the prefiltered unwanted signal by an amount necessary to directly cancel the filtered unwanted signal component of the filtered signal.

20. The filter system of claim 16, wherein the phase-shift network comprises an attenuator configured to attenuate the prefiltered desirable signal and a phase shifter configured to shift the phase of the prefiltered unwanted signal.

21. The filter system of claim 16, wherein the phase-shift network is implemented using passive components.

22. The filter system of claim 16, wherein the filter system is included in a wireless transmitter.

23. The filter system of claim 16, wherein the wireless transmitter is a mobile unit handset.

24. The filter system of claim 16, wherein the filter system is included in a mobile system base station.

* * * * *